United States Patent [19]

Mori

[11] Patent Number: 5,050,224
[45] Date of Patent: Sep. 17, 1991

[54] CHARACTER RECOGNITION APPARATUS

[75] Inventor: Kazuhiro Mori, Yokohama, Japan

[73] Assignee: Kabushiki Kaisha Toshiba, Kawasaki, Japan

[21] Appl. No.: 523,375

[22] Filed: May 15, 1990

[30] Foreign Application Priority Data

May 20, 1989 [JP] Japan ................................. 1-127519

[51] Int. Cl.$^5$ .......................... G06K 9/68; G06K 9/34
[52] U.S. Cl. .......................................... 382/34; 382/9
[58] Field of Search .................... 382/9, 48, 39, 34, 42

[56] References Cited

U.S. PATENT DOCUMENTS

| | | | |
|---|---|---|---|
| 4,594,372 | 6/1986 | Tsuji | 382/18 |
| 4,635,290 | 1/1987 | Tsuji et al. | 382/9 |
| 4,651,289 | 3/1987 | Maeda et al. | 382/15 |
| 4,864,629 | 9/1989 | Deering | 382/34 |
| 4,907,283 | 3/1990 | Tanaka et al. | 382/9 |

Primary Examiner—Leo H. Boudreau
Attorney, Agent, or Firm—Oblon, Spivak, McClelland, Maier & Neustadt

[57] ABSTRACT

An input character image signal is converted into binary image data and then stored in an image memory. The binary image data stored in the image memory are profiled in the directions of X and Y axes to set a rectangular region circumscribing a desired character string. The binary image data included in the rectangular region are compared with a dictionary pattern to obtain candidate characters and their similarities. The sum of similarities corresponding to a candidate character and when it is more than a predetermined value, the candidate character is output as the result of recognition.

11 Claims, 6 Drawing Sheets

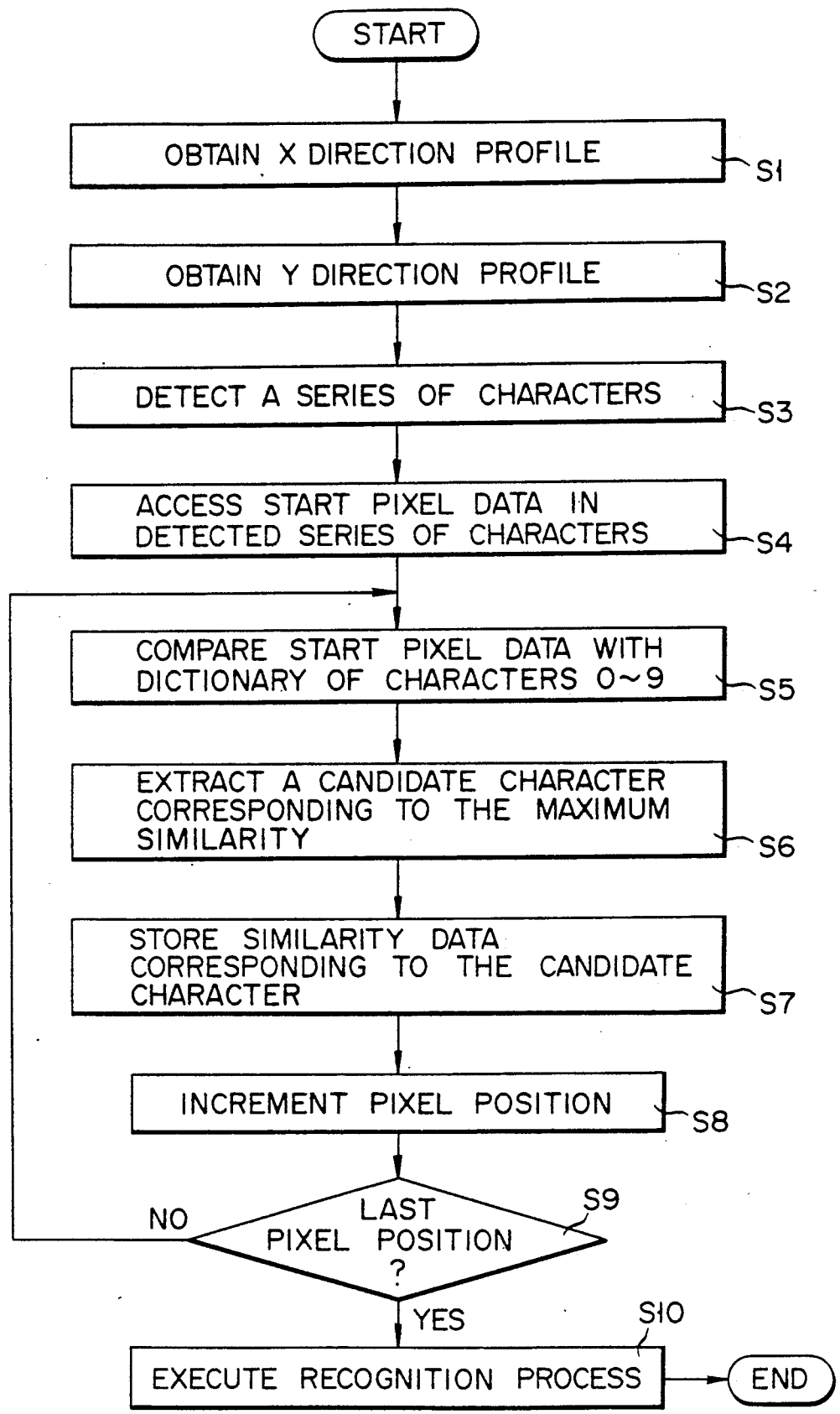
F I G. 7

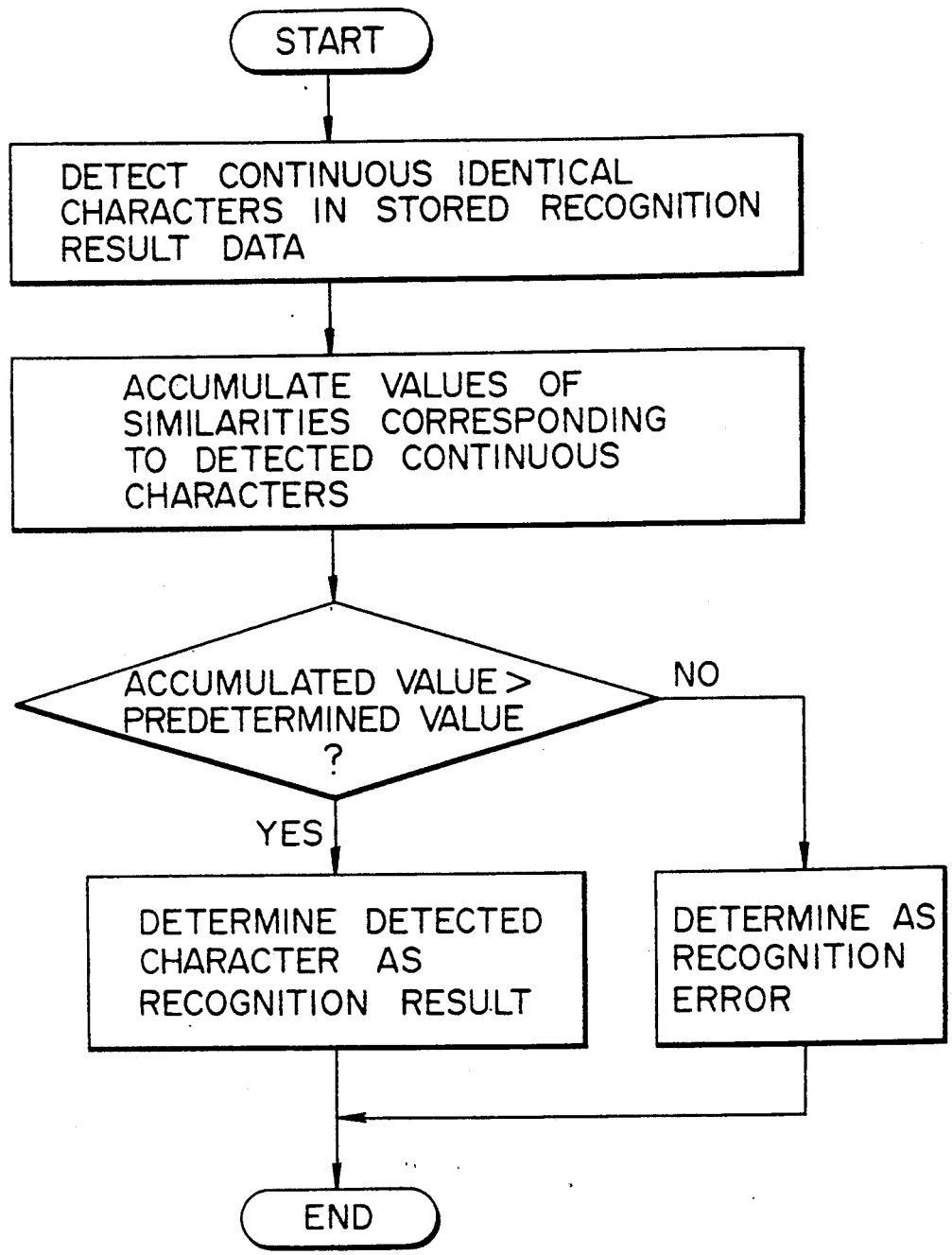
F I G. 8

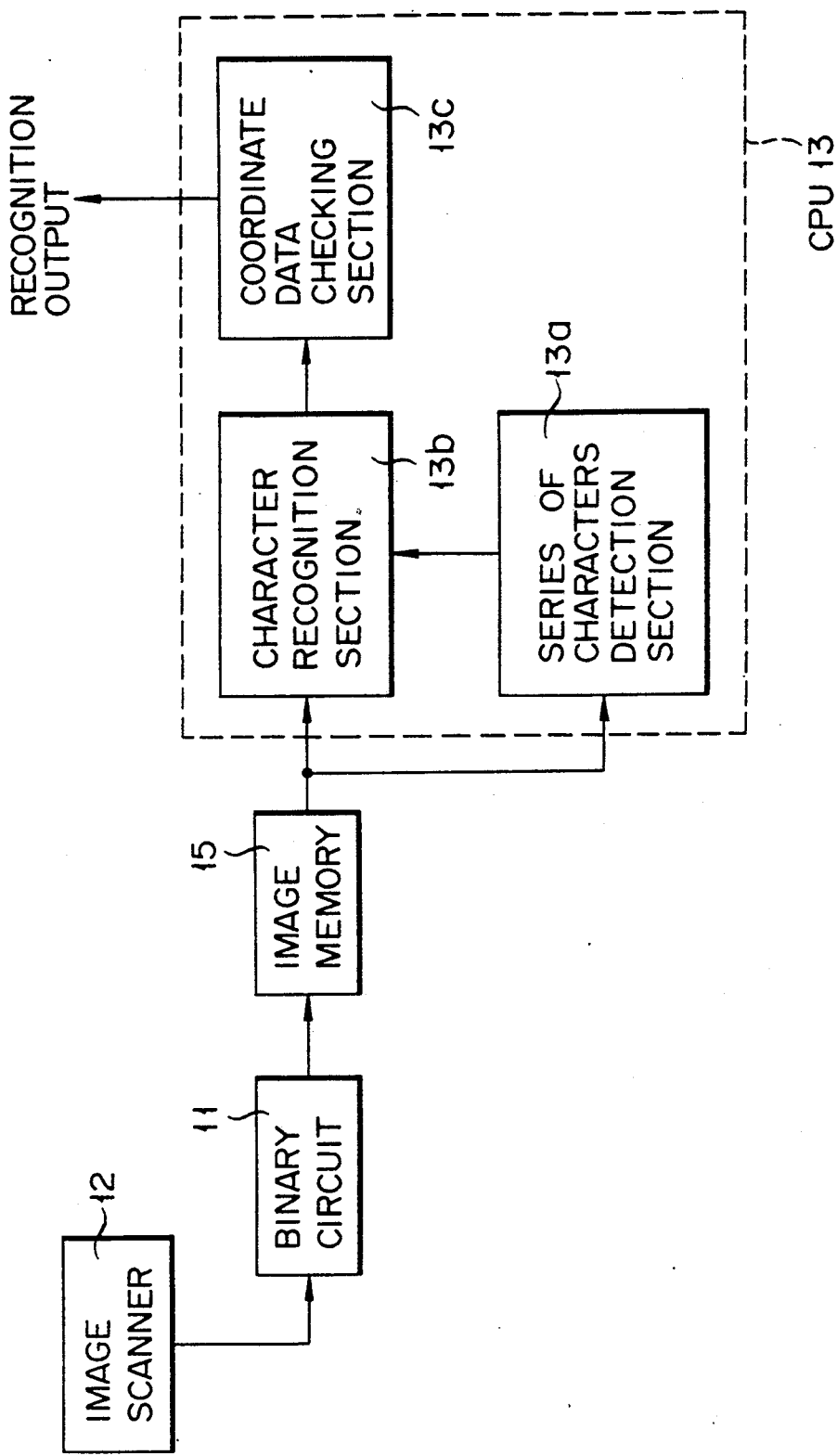
F I G. 9

CHARACTER RECOGNITION APPARATUS

BACKGROUND OF THE INVENTION

1. Field of the Invention

The present invention relates to a character recognition apparatus and, more particularly, to a character recognition apparatus for recognizing each of characters in a character series or character string which may contain a narrow character-spacing or contact portion, a noise image portion or a chipped portion.

2. Description of the Related Art

A conventional method of character recognition includes a pattern matching method. According to this method, a binary-coded character image is matched against dictionary patterns prepared in advance to recognize the character image. Thus, an accurate registration of each character to be recognized with dictionary patterns must be performed.

With a character string narrow in character spacing, however, even if a labeling process or a profiling process is employed, an accurate registration of each character with dictionary patterns will be difficult because of narrow or contact between characters, contact between a character and a noise image or a chipped portion in a character image which may occur in a binary coding process for characters.

A problem with the conventional character recognition method is the difficulty of an accurate registration of each character with dictionary patterns due to contact between binary character images, contact between a character and a noise image or a chip in a binary image in the image of a character string with narrow character spacing, thereby failing to obtain good results of recognition.

SUMMARY OF THE INVENTION

It is therefore an object of the present invention to provide a character recognition apparatus which permits good results of recognition to be obtained even in a case where an accurate registration of each character with dictionary patterns is difficult due to contact between binary images, contact between a binary image and a noise image or a chip in a binary image in the image of a character string with narrow character spacing.

According to the present invention, there is provided a character recognition apparatus comprising: binary coding means for binary coding an input character image; character string detecting means for detecting a character string from the character image binary-coded by said binary coding means to set a rectangular region circumscribing the detected character string; recognition means for making matching while scanning a dictionary pattern within the rectangular region set by the character string detecting means to calculate similarities of individual pixel data to thereby obtain results of recognition; and outputting means for obtaining sums of similarities in regions each of which has identical results of recognition obtained by the recognition means linked together and classifying the sums of similarities in order of magnitude to output corresponding results of recognition.

Matching is made while a dictionary pattern is scanned within the rectangular region circumscribing the detected character string to calculate similarities at individual points to thereby obtain results of recognition. Furthermore, the sums of similarities in regions each of which has identical results of recognition linked together and then classified in order of magnitude to obtain the result of recognition.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 7 and 8 are flowcharts for use in explanation of the operation of the embodiment of FIG. 1; and FIG. 9 is a functional block diagram illustrating the function of the CPU in the embodiment of FIG. 1.

DETAILED DESCRIPTION OF THE PREFERRED EMBODIMENT

Figure 1:
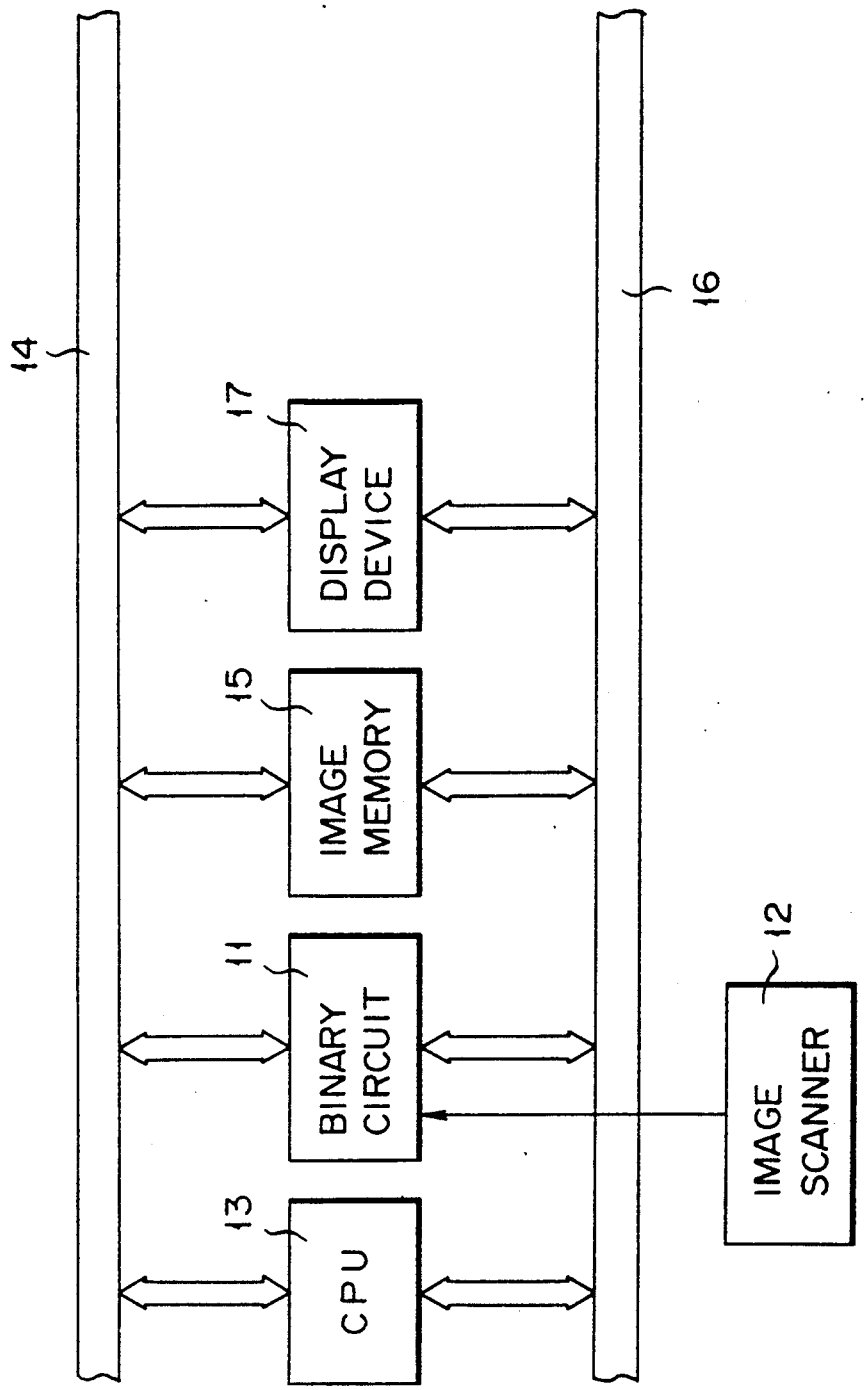
FIG. 1 is a block diagram illustrating the overall arrangement of a character recognition apparatus embodying the present invention.
Figure 2:
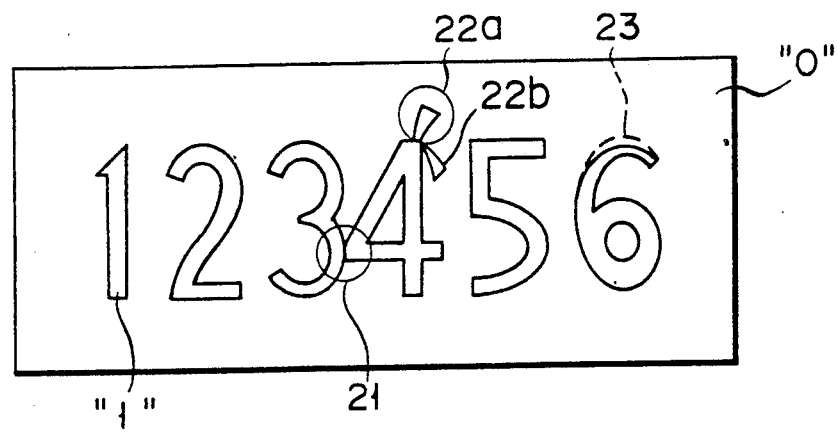
FIG. 2 illustrates an example of a character string to be recognized.

In FIG. 1, a binary-coding circuit 11 codes a multivalued character image signal supplied from an image scanner 12 as binary image data having, for example, 0s for the background and 1s for character portions. Although there are various methods of binary coding, the binary coding method is not particularly important to the present invention. Therefore, the present invention will be described herein in terms of a simple binary coding method using a fixed threshold value. That is, with an image signal of some threshold value and above set at a 1 and an image signal below the threshold value set at a 0, if the threshold value is set properly, then such a binary image of a character string as shown in FIG. 2 will be obtained. The binary image is transferred to an image memory 15 via an image bus 14 and temporarily stored therein under the control of a central processing unit (CPU) 13. The addressing control of memory 15 is executed by CPU 13 via a general-use bus 16.

With binary images having proper character spacing therebetween, such as characters (1) and (2); (2) and (3) in the example of FIG. 2, the determination of coordinates of individual characters for registration with dictionary patterns by use of, for example, the well known labeling process, or the character detecting and cutting process can be performed easily.

As shown in FIG. 2, however, in case where characters with narrow spacing, such as characters (3) and (4), make a portion 21 of contact therebetween, a noise image 22a or 22b contacts a character as depicted at the right upper portion of character (4), or a character has a chipped portion 23 of character (6), the determination of coordinates of individual characters for registration with dictionary patterns will become difficult.

According to the present invention, irrespective of the difficulty involved in registering individual characters with dictionary patterns due to such contact between characters, contact of a noise image with a character or a chip of a character, good recognition can be achieved by such a process as described below.

Figure 3:
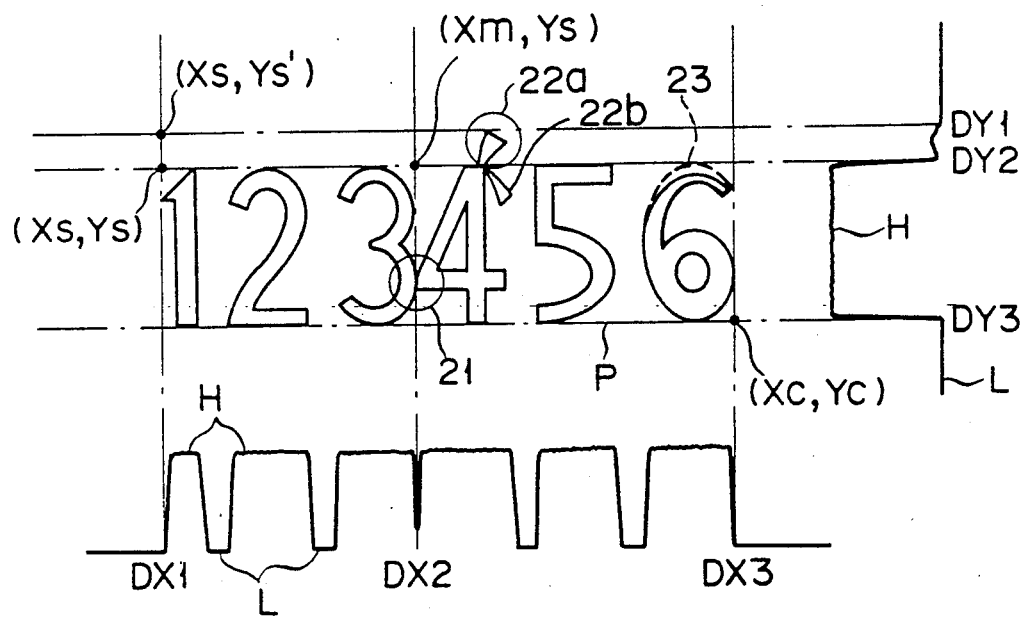
FIG. 3 is a diagram for use in explanation of the character string detecting operation.

CPU 13 next executes a character string detecting operation. That is, CPU 13 detects and cuts out a character string from binary image data stored in binary image memory 15 by use of, for example, profiles of the character string in the directions of X and Y axes as shown in FIG. 3, i.e., the profiling method. In this case, a rectangular region P circumscribing the detected character string is set and coordinate information (Xs, Ys), (Xc, Yc) of the rectangular region is output as information representing the character region including characters to be recognized.

That is, in detecting the character string, the addresses of image memory 15 are designated by CPU 13 and binary data 1s and 0s are sequentially added in each of the X and Y directions so that the add data are stored in separate areas of image memory 15. With the Y coordinate fixed at Y's, if binary data from Xs to Xc along the X axis are sequentially read out to be added, then a 1 is added only at noise image 22a so that add data DY1 at a small level is obtained. With the Y coordinate fixed at Ys, the addition of binary data from Xs to Xc results in add data DY2 at a large level because 1 at the upper ends of respective characters in the character string (1, 2, 3, 4, 5, 6) are added together. It is to be noted that characters are assumed herein to have an equal height. With the Y coordinate fixed at Yc, if binary data are likewise added from Xs to Xc along the X axis, then add data DY3 at a large level will be obtained. When the Y coordinate is incremented from Yc, the add data level decreases abruptly. Thus, the region of the character string along the Y axis is represented by the Y coordinates (Ys, Yc) associated with data DY2 to DY3. It will thus be appreciated that noise image 22a has been removed.

With the X coordinate fixed at Xs, on the other hand, if binary data from Y's to Yc along the Y axis are sequentially read out for addition, then add data DX1 at a small level will be obtained. For characters (1) and (2), the addition of binary data along the Y axis will produce data which is at a high (H) level at character portions and at a low (L) level at a space between the characters. With characters (3) and (4), however, since they contact each other partially at Xm on the X axis as shown in FIG. 3, data DX2 resulting from addition of binary data along the Y axis at Xm on the X axis will have a level intermediate between the high and low levels. In such a case, it will be predicted that contact between characters is made.

Contact of noise image 22a with character (4) produces data between data DY1 and DY2 in the profile in the direction of X axis, but it will not appear as data in the profile in the direction of Y axis because it is absorbed into character (4). In a case where a noise image 22b is contacted with the character (4) at its right upper portion as shown in FIGS. 2 and 3, data according to the noise image 22b will not appear in both profiles in the X and Y axes, because it is absorbed into character (4). Chip 23 in character (6) will also not appear as profile data in the direction of Y axis because it is absorbed into character (6).

After the coordinates of rectangular region P[(Xs, Ys), (Xc, Yc)]have been obtained in that way, a process of recognizing the characters (1-6) contained in the rectangular region P is carried out by CPU 13.

Figures 4, 5, 6:
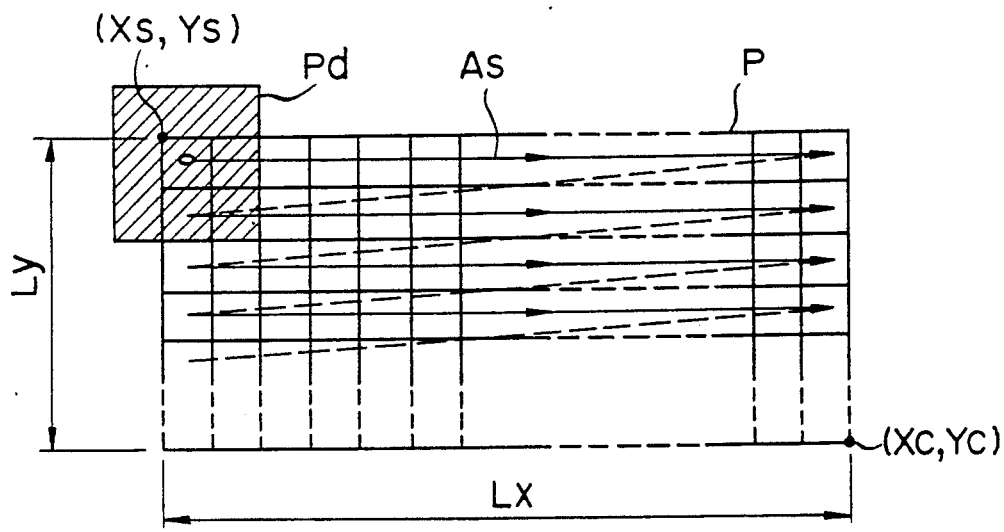
FIG. 4 is a diagram illustrating the pattern matching process.
FIG. 5 is a diagram illustrating results of recognition.
FIG. 6 illustrates a table of similarities corresponding to FIG. 5.

For example, as shown in FIG. 4, binary images within the rectangular region P circumscribing the character string (1-6) are registered with the center of a dictionary pattern Pd that CPU 13 has while they are shifted pixel by pixel in the directions of X and Y axes like raster scan to perform the pattern matching recognition process.

Thereby, when rectangular region P circumscribing the character string has $Lx \times Ly$ pixels (Lx is the number of pixels along its lateral width and Ly is the number of pixels along the its longitudinal width), the sequential pattern matching in the direction of an arrow As will provide $(Lx \times Ly)$ results of recognition and similarities. The similarity refers to an extent which quantitatively represents the degree of coincidence between an input pattern and a dictionary pattern. The higher the similarity, the higher is the certainty of a result of recognition.

That is, when the pattern matching is made for regions which do not correspond to the characters (1-6) within rectangular region P circumscribing the character string, the results of recognition are uncertain and the similarities are low. However, the pattern matching for regions corresponding to the characters will provide correct results of recognition and high similarities. Data indicating those results of recognition and similarities are stored in CPU 13.

FIG. 5 illustrates results of recognition and FIG. 6 illustrates similarities corresponding to the results of recognition of FIG. 5. In FIG. 6, the similarity is represented in terms of a numeric value of 0 to 10 for the sake of convenience. Moreover, FIGS. 5 and 6 illustrate, for convenience of description, the results of recognition and similarities for a portion of character string (3-6) of the character string (1-6) shown in FIG. 3.

From the results of recognition in FIG. 5 CPU 13 finds regions, as indicated at A to D, each of which has identical characters linked together and then provides the characters (3), (4), (5) and (6) filling the regions A to D for candidate characters. At the same time, CPU 13 sets corresponding regions A' to D' in the similarity data shown in FIG. 6 and finds the total of the similarities contained in each of regions A' to D'.

In the example of FIG. 6, the total of the similarities in region A' is 64 (the third place output), the total of the similarities in region B' is 82 (the second place output), the total of the similarities in region C' is 56 (the fourth place output) and the total of the similarities in region D' is 83 (the first place output).

Moreover, CPU 13 checks the results of recognition by use of the coordinates. That is, there is an exceptional case where the result of recognition is uncertain and the similarity can be high at a place spaced apart from a character or a place between characters. In such a case, CPU 13 can use coordinate information on the spacing between characters and vertical alignment of each character resulting from the profile data DY2–DY3, DX1-DX3 to check whether or not the result of recognition truly results from a character. In this way by finally outputting the results of recognition obtained by use of the coordinate information as well, good results of recognition will be obtained even if the cutout of each character is impossible.

Next, the operation of the above embodiment will be described in detail with reference to flowcharts of FIGS. 7 and 8.

In FIG. 7, profile data DY1-DY3 in the direction of X axis is detected and stored in step S1. Next, profile data DX1-DX3 in the direction of Y axis is detected and stored in step S2. The levels of the stored data are compared with a reference level which is slightly lower than a high (H) level to cut out a collective region of profile data which are at a high level in the form of a rectangular region P. The coordinates (Xs, Ys), (Xc, Yc)] of the rectangular region P are obtained, thereby detecting a character string in step S3.

In step S4, by the use of thus obtained coordinates [(Xs, Ys), (Xc, Yc)] of the character string, access is made to the start position in image memory 15 that corresponds to the coordinates (Xs, Ys) to read pixel data therefrom. In the subsequent step S5, the first pixel data is compared with dictionary patterns Pd prepared in CPU 13 in sequence to find similarities. In the present embodiment, as the dictionary patterns, 10 pieces of character data from (0) to (9) are prepared.

In step S5, the matching of the first pixel data is made against the dictionary patterns of (0) to (9) to store similarities for the respective dictionary patters. In the subsequent step S6, a character having the maximum similarity of the stored similarities is extracted as a candidate character and then sent to the memory for storing the results of recognition shown in FIG. 5. At the same time, the similarity corresponding to the candidate character is stored in the memory in such a form as shown in FIG. 6 in step S7.

After the result of recognition and similarity of the first pixel data have been stored in the memory, the pixel position is shifted one pixel in the direction of X axis as shown in FIG. 4 in step S8. Since, at this point, NO in step S9, the steps S5 to S7 are repeated for the second pixel data to return to step S9. When the result of recognition and similarity are obtained for the pixel data corresponding to the last coordinates (Xc, Yc) of the character string, YES is made in step S9 so that the process proceeds to step S10. In step S10, the recognition process is performed whose processing steps are shown in FIG. 8.

In step T1 of FIG. 8, regions A to D each of which has pixels indicating the same character linked together as shown in FIG. 5 are detected in the memory. In subsequent step T2, the similarities contained in each of regions A' to D' of FIG. 6 in the similarity memory which correspond to regions A to D are summed up.

In subsequent step T3, a comparison is made in magnitude between the sum of similarities and a predetermined value. If the sum of similarities is larger than the predetermined value, then a corresponding detected character is displayed on a cathode ray tube. If, on the other hand, the sum of similarities is less than the predetermined value, then it is determined in step T5 that an error has been made in recognition.

FIG. 9 is a functional block diagram illustrating the operation of the present embodiment. As shown, CPU 13 of FIG. 1 functionally includes a character string detecting section 13i a for detecting a character string from binary data stored in image memory 15, a character recognition section 13b for recognizing each of characters contained in the character string read from image memory 15 using the detected character string data (in the embodiment the coordinate data [(Xs, Ys), (Xc, Yc)] of rectangular region P) and a coordinate data checking section 13c for checking a candidate character obtained in character recognition section 13b using coordinates of X and Y profile data obtained in character string detecting section 13a. A recognized character output thus obtained is sent to display section 17 of FIG. 1 so that the recognized character is displayed.

In the present embodiment, the binary coding circuit employs a simple binary coding method. Alternatively, another binary coding method, such as floating-threshold binary coding or differential binary coding, may be employed.

In addition, the detection and cutting out of a character string may be made not only by use of profiles but also by use of the labeling process.

Furthermore, the registration of a character string with a dictionary pattern Pd within a rectangular region circumscribing the character string may be made not only by shifting the character string pixel by pixel in the direction of raster scan as in the above embodiment but also by sampling the character string at intervals of two pixels.

As described above in detail, according to the present invention, by making matching while scanning a dictionary pattern within a rectangular region circumscribing a detected character string, obtaining the sums of similarities in regions each of which identical recognition results obtained at individual points linked together and classifying the sums of similarities in order of magnitude to output corresponding recognition results, a character recognition apparatus can be provided which permits good recognition results to be obtained even in a case where the registration of each character with the dictionary pattern is difficult due to contact between binary images in a character string with narrow character spacing, contact of a noise image with a character and a chip in a binary image.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A character recognition apparatus comprising:

character string detecting means for detecting an image pattern of a character string including a series of characters;

means for comparing the image pattern with a dictionary pattern while relative positions of the image and dictionary patterns are sifted by a predetermined distance;

means for obtaining results of recognition and corresponding similarity values at each of the relative positions of the image and dictionary patterns in response to a comparison result in said comparing means;

means for detecting an area in which each of the results of recognition are the same at adjacent relative positions;

means for obtaining a sum of similarity values corresponding to the relative positions in the area detected by said detecting means; and means for outputting the results of recognition detected in said area when the sum of the similarity values exceeds a predetermined value.

2. A character recognition apparatus according to claim 1, in which said character string detecting means includes an image memory for storing binary character string data; means for profiling said binary character string data stored in said image memory to X-direction profile data and Y-direction profile data; and means for obtaining coordinate values which define said rectangular region containing said character string from said X- and Y-direction profile data.

3. A character recognition apparatus according to claim 2, in which said means for obtaining coordinate values includes means for obtaining said coordinate values in accordance with X and Y coordinates at ends of said rectangular region at which said X- and Y-direction profile data have a level higher than a predetermined value.

4. A character recognition apparatus according to claim 1, further comprising means for checking the result of recognition using coordinates of said character string.

5. A character recognition apparatus according to claim 1, wherein said relative positions are shifted pixel by pixel.

6. A character recognition apparatus comprising:
character string detecting means for detecting an image pattern of a character string including a series of characters;
means for comparing the image pattern with a dictionary pattern while relative positions of the image and dictionary patterns are shifted by a predetermined distance;
means for obtaining a first memory table of results of recognition arranged in a first matrix and a second memory table of corresponding similarity values arranged in a second matrix at each of the relative positions of the image and dictionary patterns in response to a comparison result in said comparing means.
means for detecting an area in said first memory table in which each of the results of recognition are the same at adjacent relative positions;
means for obtaining a sum of the similarity values in said second memory table corresponding to the relative positions in the area detected by said detecting means; and
means for outputting the results of recognition detected in said area when the sum of the similarity values exceeds a predetermined value.

7. A character recognition method comprising the steps of:
detecting an image pattern of a character string including a series of characters;
comparing the image pattern with a dictionary pattern while relative positions of the image and dictionary patterns are shifted by a predetermined distance;
obtaining results of recognition and corresponding similarity values at each of the relative positions of the image and dictionary patterns in response to a comparison result of said image pattern with the dictionary pattern;
detecting an area in which each of the results of recognition are the same at adjacent relative positions;
obtaining a sum of the similarity values corresponding to the relative positions in the area detected by said detecting step; and
outputting the results of recognition detected in said area when the sum of the similarity values exceeds a predetermined value.

8. A character recognition method according to claim 7, in which said detecting an image pattern of a character string step includes the steps of storing binary character string data; profiling said stored binary character string data to X-direction profile data and Y-direction profile data; and obtaining coordinate values which define said rectangular region containing said character string from said X- and Y-direction profile data.

9. A character recognition method according to claim 8, in which said coordinate values obtaining step includes the steps of obtaining said coordinate values in accordance with X and Y coordinates at ends of said rectangular region at which said X- and Y-direction profile data have a level higher than a predetermined value.

10. A character recognition method according to claim 7, further comprising the step of checking the results of recognition using coordinates of said character string.

11. A character recognition method according to claim 7, wherein said results of recognition and the corresponding similarity values are stored in first and second table memories, respectively.

* * * * *